United States Patent [19]

Barbieri

[11] Patent Number: 4,574,688

[45] Date of Patent: Mar. 11, 1986

[54] APPARATUS FOR COOKING FOOD

[76] Inventor: Giovanni Barbieri, via Marosticana n. 18, Dueville (Vicenza), Italy

[21] Appl. No.: 716,503

[22] Filed: Mar. 26, 1985

[30] Foreign Application Priority Data

Apr. 12, 1984 [IT] Italy ............................... 84928 A/84

[51] Int. Cl.$^4$ ............................................. A47J 27/18
[52] U.S. Cl. ...................... 99/330; 99/336; 99/407; 126/362; 219/438
[58] Field of Search ................. 99/448, 330, 336, 403, 99/407, 411; 219/436, 438, 434; 126/362, 365

[56] References Cited

U.S. PATENT DOCUMENTS

| 3,859,981 | 1/1975 | Yoshida | 99/330 X |
| 3,958,503 | 5/1976 | Moore | 99/336 X |
| 4,084,492 | 4/1978 | Sullivan | 99/407 X |

FOREIGN PATENT DOCUMENTS 916745 8/1954 Fed. Rep. of Germany ........ 99/330

Primary Examiner—Billy J. Wilhite
Attorney, Agent, or Firm—Browdy and Neimark

[57] ABSTRACT

The present invention pertains to an apparatus (1) for cooking food, particularly for cooking food by temporarily dipping it into a liquid at high temperature which allows to carry out a continuous replacement of the liquid present in the cooking vessel (2) so that the purity and clearness characteristics thereof are kept almost unchanged during the repeated dippings of food, while maintaining the temperature unchanged too.

The apparatus (1) comprises the use of an additional receptacle (6) for the liquid, disposed close to the cooking vessel (2) and to the respective heating members (5) and inside which the liquid itself is brought to its optimal temperature and then sent to the cooking vessel (2). The latter is provided at the bottom with an opened discharge port (16) through which the cloudy liquid is evacuated and to which a trap (17) suitable to allow the liquid to maintain a predetermined level within the cooking vessel (2) is connected.

8 Claims, 1 Drawing Figure

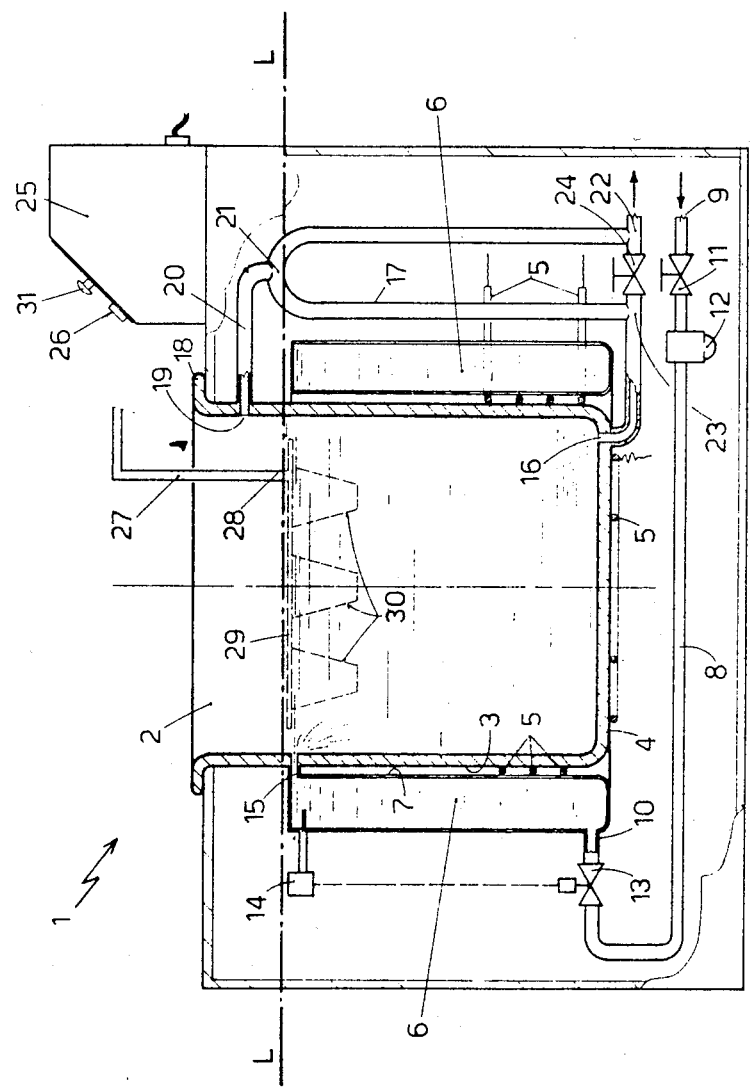

APPARATUS FOR COOKING FOOD

FIELD OF THE INVENTION

The present invention relates to an apparatus for cooking food, particularly by temporarily dipping it into a liquid at high temperature, e.g. pasta into boiling water, fish or other food to be fried into oil, said apparatus being particularly intended to be used when rather high production rates are needed as in the case of restaurants, works canteens, etc.

BACKGROUND OF THE INVENTION

It is known that the cooking of food of the above mentioned sort is carried out by dipping the same for a predetermined period of time into the appropriate cooking liquid contained in a vessel provided with a suitable heating means. Presently the equipments adopted in the restoring field for communities do not substantially divert from the traditional home ones apart from the sizes of vessels used and from the food dipping methods.

Furthermore, it is known that for fundamentally practical reasons, when a high productivity is involved, the same liquid contained in the cooking vessel is likely to be used several times for the next cookings. All that gives rise to a storage of food particles in the cooking liquid (should this liquid consist of oil the same would be subjected to a remarkable degradation and would lose its original characteristics), which considerably damages the quality of the product.

It is therefore necessary to empty the cooking vessel very often and to fill it again with fresh liquid which, in order to save time, is often preheated separately.

In any case a discontinuous operation is required which involves a waste of time (in fact in spite of a pre-heating carried out separately, it is always necessary to wait for the optimal temperature to be reached in the cooking vessel) and obvious drawbacks of practical nature (the danger of pouring off large quantities of boiling liquids should be taken into account). Furthermore, what above also has an economic disadvantage due to the fact that a source of additional heat equipped with all necessary accessory apparatuses is needed.

OBJETS

The main object of the present invention is therefore to overcome the above mentioned drawbacks relating to the hitherto known art, by providing an apparatus for cooking food which allows to carry out a continuous replacement of the cooking liquid so that the purity and clearness characteristics thereof are kept almost unchanged during the repeated dippings of food, while maintaining the optimal cooking temperature also unchanged, said apparatus being at the same time of simple construction and of relatively low operating cost.

SUMMARY OF THE INVENTION

The foregoing and still further objects are attained by the apparatus for cooking food of the present invention comprising a cooking vessel adapted to contain a liquid (such as, for example, water or oil) as well as a heating means associated therewith, wherein an additional receptacle is provided which is located close to said cooking vessel and heating means, in which said liquid, introduced through a feeding line, is brought to the optimal temperature and thereafter sent, through a connection duct, to said cooking vessel, said cooking vessel being provided at its bottom with an opened discharge port to which a trap associated downstream with an evacuation pipe, is connected, which trap is suitable to allow the level of liquid contained in said cooking vessel to be always at a predetermined value, said cooking vessel being also provided, close to its upper rim, with a safety drain opening acting as an overflow to which a drain pipe associated downstream with the top of said trap, is connected.

Advantageously and according to a further feature of the present invention, along the feeding line of said additional receptacle a shutoff valve is provided which is electrically controlled by a measure member capable of detecting the temperature of the liquid close to said connection duct, said shutoff valve allowing the liquid to temporarily flow into said additional receptacle when the temperature of the liquid itself near said connection duct reaches a predetermined value.

BRIEF DESCRIPTION OF THE DRAWING

Further features and advantages of the invention will become more apparent from the following detailed description of a preferred embodiment of a cooking apparatus according to the present invention in which the cooking liquid may for example consist of water (similar remarks being however valid where the cooking liquid consists of oil), given hereinafter by way of example only with reference to the accompanying drawing in which the only FIGURE is a partially sectioned diagrammatic view of the subject apparatus taken along a vertical plane.

DESCRIPTION OF THE PREFERRED EMBODIMENT

With reference to the accompanying drawing it has been generally indicated at 1 the cooking apparatus of the present invention. It comprises an essentially cylindrical cooking vessel 2 of the traditional type on the outer side wall 3 of which, close to the bottom 4 thereof and on the bottom itself, a heating means is disposed, which in this case consists of the electrical coil resistors 5.

Outside the vessel 2 and concentric therewith there is an additional closed receptacle 6, of annular form, the inner volume of which is remarkably lower than the cooking vessel's 2, the outer cylindrical wall 7 of said additional receptacle 6 facing the vessel 2 itself being placed in contact with the electrical resistors 5 so that it is in close proximity to the corresponding surface 3. Owing to this configuration the heating means proper to vessel 2 can be advantageously exploited for the additional receptacle 6.

It should be observed that, when the embodiment of the invention is put into practice the group made up of vessel 2, receptacle 6 and resistors 5 appears completely insulated (for the sake of simplicity in the accompanying drawing the insulating means is not shown).

Furthermore, should said heating means consist of a flame burner disposed below the vessel 2 (instead of consisting of the above mentioned resistors) the arrangement of the parts would substantially be the same. In that case the cylindrical hollow space defined by walls 3 and 7 would act as a stack for the flue gases, which would involve further advantages as to heat recovery. In this case it would be sufficient to provide a smoke conveyor (for example a hood of annular form) on top of the receptacle 6 connected to the surrounding atmosphere of the apparatus 1.

Always referring to the drawing, a water feeding line has been allocated the reference number 8. Water is drawn from the water network at 9 and sent to the base of the receptacle 6 at 10. On line 8, close to the connection portion 9 to the network, provision is made for a member designed to shut off the water flow (for example a hand-operated cock 11) and for a filtering device 12. Upstream of the pipe length 10, the line 8 is provided with a shutoff valve 13, electrically controlled by a measure member 14 for detecting the temperature existing at the upper part of the receptacle 6 in the region of the connection duct 15 which is designed to put the receptacle 6 in communication with the inner part of vessel 2. The latter is provided, at the bottom 4 thereof, with an opened discharge port 16 to which a trap 17 is connected and, close to the upper rim 18 thereof, with a safety drain opening 19 acting as an overflow to which a drain pipe 20 associated downstream with the top 21 of said trap 17, is connected. Downstream, said trap 17 is connected in turn to an evacuation pipe 22. It is to be noted that a by-pass tube 23 is provided in the region of the trap 17, downstream of the discharge port 16; along said tube 23 a hand operable drain valve 24 is inserted (suitable to be used to allow a complete washing of the apparatus 1) which directly connects the discharge port 16 to the evacuation pipe 22.

OPERATION

The operation of the hydraulic circuit as described above is as follows.

After opening the cock 11, the cooking liquid, in this case water, is caused to flow to a small amount into vessel 2, through the additional receptacle 6, acting on the valve 13 by means of an actuator (not shown) placed on a control board 25. As soon as a small quantity of liquid is in vessel 2 (at the same time the receptacle 6 is completely filled with the same liquid) the heating means (resistors 5) will be turned on and the valve 13 will be closed by the above mentioned actuator.

When the optimal temperature is reached in the receptacle 6 (for example 100° C. in the case of water) the member 4 automatically acts on valve 13 causing a quantity of fresh liquid to flow into the receptacle 6. As a result, an equal quantity of liquid at high temperature will overflow into vessel 2 through the connection duct 15. After a lapse of a few seconds, owing to the fact that the temperature of the liquid in the receptacle 6 has decreased as a result of the introduction of cold liquid, the member 14 will cause the valve 13 to be closed. Therefore the introduction of hot liquid into vessel 2 will take place at predetermined time intervals. It should be understood that the member 14 can be set at will so that the opening of the valve 13 may occur at selected temperature values of the liquid present in the region of the connection duct 15. More particularly and advantageously, the setting of member 14 can be previously scheduled acting on a suitable command 16 disposed on the control board 25, depending upon the kind of cooking liquid used.

At a normal operation, the liquid surface within the vessel 2 will reach the level L corresponding to the top level of the trap 17. It is to be noted that the connection duct 15 is placed at a slightly lower level than the liquid surface within vessel 2 in order to prevent the jets of hot liquid (and eventually of steam) from being thrown towards and into the upper zone of vessel 2.

As during the cooking of food most of the impurities get stored close to the bottom 4 of vessel 2, when the liquid goes out through the discharge port 16 said impurities are entrained therewith. In this way the liquid can always be maintained at a sufficiently high degree of purity without causing remarkable variations in the optimal temperature of the same.

If the cooking liquid consists of oil, it will only be sufficient to make a few practical modifications to the above described hydraulic circuit. In particular, a recycle pipe joining the evacuation pipe 22 to the inlet pipe length 9 will be provided and along this recycle pipe it will be necessary to place a filtering device for the impurities and a tank of suitable capacity equipped with a pump designed to determine the oil flow within the feeding line 8.

As shown in the drawing, the dipping of food into the cooking liquid is accomplished by means of a substantially vertically movable arm 27 carrying at its lower end 28 a horizontal support plate 29 provided with a number of circular holes within which substantially frustoconical baskets 30 suitable to contain the food being cooked are housed. The arm 27 which is driven by members not shown as known in themselves, can carry out vertical displacements according to predetermined lapses of time between a position, outside the vessel 2, in which it reaches its maximum raising to the position of its maximum lowering in which plate 29 is disposed slightly below the level L of the liquid surface. More particularly, the lowering step of arm 27 is controlled manually by an actuator 31 located on the control board 25 while the lifting step takes place automatically after a predetermined period of time, a timer (not shown) being provided which is regulated depending upon the kind of food being cooked.

The invention attains the intended purposes.

Obviously the invention hereinbefore described may be embodied in other specific forms and in particular several modifications and variations of a practical nature which are apparent to a person skilled in the art may be made to the apparatus in question without departing from the scope and spirit of the present invention.

Furthermore, the materials used, the shapes and sizes may be whatever according to the requirements and all members and accessories may be replaced by technically equivalent elements.

What I claim is:

1. An apparatus for cooking food, particularly by temporarily dipping it into a liquid at high temperature, comprising a cooking vessel adapted to contain said liquid, as well as a heating means associated therewith, wherein an additional receptacle is provided which is located close to said cooking vessel and heating means in which said liquid, introduced through a feeding line is brought to the optimal temperature and thereafter sent through a connection duct to said cooking vessel, said cooking vessel being provided at its bottom with an opened discharge port to which a trap associated downstream with an evacuation pipe is connected, which trap is suitable to allow the level L of the liquid contained in said cooking vessel to be always at a predetermined value, said cooking vessel being also provided, close to its upper rim with a safety drain opening acting as an overflow to which a drain pipe associated downstream with a top of said trap is connected.

2. The apparatus according to claim 1 wherein along said feeding line to the additional receptacle a shutoff valve is provided which is electrically controlled by a measure member for detecting the temperature of the liquid that is present in the region of said connection duct, said shutoff valve allowing the liquid to temporarily flow into said additional receptacle when the temperature of the liquid itself near said connection duct reaches a predetermined value.

3. The apparatus according to claim 1, wherein said connection duct debouches into said cooking vessel at a slightly lower level than the top of said trap so that, during a normal operation, the liquid can flow into said cooking vessel slightly below the surface level L of the liquid contained in the cooking vessel itself.

4. The apparatus according to claim 1, wherein, downstream of said discharge port in the region of the trap, a by-pass tube is provided, along which a drain valve is disposed, which directly connects said discharge port of the cooking vessel to said evacuation pipe.

5. The apparatus according to claim 1, wherein said additional receptacle has a substantially annular shape and is disposed concentrical with said cooking vessel and outside the same to a short distance from the outer surface thereof.

6. The apparatus according to claim 1, wherein said heating means is partially disposed within a space existing between an outer surface of said cooking vessel and said additional receptacle.

7. The apparatus according to claim 1, wherein temporary dipping of food into the liquid contained in said cooking vessel is carried out by means of a substantially vertically movable powered arm carrying a horizontal support plate at its lower end, which is provided with a number of holes within which baskets suitable to contain said food are housed, said arm being capable of carrying out vertical displacements according to predetermined lapses of time and respectively between a position, outside the cooking vessel, in which it reaches its maximum raising to the position of its maximum lowering inside the vessel in which said plate is disposed slightly below the surface level L of the liquid contained in said cooking vessel.

8. The apparatus according to claim 5, wherein said heating means is partially disposed within the space existing between an outer surface of said cooking vessel and said additional receptacle.

* * * * *